United States Patent [19]

Hartman

[11] Patent Number: 5,276,064

[45] Date of Patent: Jan. 4, 1994

[54] COLORED EXTRUDED FOAM CROSS-LINKED BACKER ROD

[75] Inventor: Steven Hartman, Erin, Canada

[73] Assignee: Industrial Thermo Polymers Limited, Mississauga, Canada

[21] Appl. No.: 82,109

[22] Filed: Jun. 28, 1993

[51] Int. Cl.⁵ .................................................. C08J 9/04
[52] U.S. Cl. ............................................ 521/95; 521/79; 521/91; 521/143
[58] Field of Search .................. 521/143, 91, 79, 95

[56] References Cited

U.S. PATENT DOCUMENTS

| | | | |
|---|---|---|---|
| 3,904,557 | 9/1975 | Guthrie et al. | 521/99 |
| 4,006,741 | 2/1977 | Arluck | 521/85 |
| 5,007,765 | 4/1991 | Dietlein et al. | 404/74 |
| 5,098,782 | 3/1992 | Hovis et al. | 521/97 |

*Primary Examiner*—Morton Foelak

[57] ABSTRACT

The present invention relates to the forming of extruded foam products such as backer rods which are of a cross-linked polyethylene. Disazo condensation color pigments have been found to be particularly suitable as relative fast cross-linking occurs after extrusion. Use of traditional inorganic color pigments substantially impede the cross-linking mechanism. The invention is also directed to a method of forming such cross-linked products.

10 Claims, No Drawings

COLORED EXTRUDED FOAM CROSS-LINKED BACKER ROD

BACKGROUND OF THE INVENTION

Extruded foam and backer rods have been used for many years and basically provide a compressible filler member which may be placed in a crack to provide a support surface for a sealant. In some cases, open celled backer rods have been used, and in other cases the backer rods are closed celled. The compressibility of the backer rod can also vary with the application.

Some backer rods are manufactured for use with hot sealants, and thus, must retain their integrity when a hot sealant comes in contact therewith. To achieve this result, a cross-linked extruded polyethylene foam product is used. Basically, the extruded foam product undergoes cross-linking after the manufacturing thereof, typically for at least 24 hours. Foam polyethylene cross-linked product that uses carbon particles as a coloring agent has sufficient cross-linking for its intended use within 72 hours of manufacture thereof. The rate of cross-linking can vary, but typically it is desired to have sufficient cross-linking to allow the foam product to work for a hot sealant application, at least within one week of manufacture and preferably within 72 hours of manufacture.

In most cases, cross-linked backer rods for hot sealant applications were manufactured in a black color by adding carbon particles to the polyethylene material, which is eventually extruded to form the backer rod. The carbon particles do not appear to significantly alter the rate of cross-linking.

It is also possible to provide a generally white type product by not adding any color pigments. In some applications, it is desirable to have different color identifications for different applications. It was found that adding non-black color pigments or dyes to the polyethylene material used to form cross-linked product seriously adversely affected the rate of cross-linking, as it appears that the color pigments interfered with this process. The color pigments and dyes used were those typically used in noncross-linked foam polyethylene backer rod products. In particular, it was found that red color pigments of an inorganic type, which would be used in this type of product if it was not cross-linked, seriously delayed the cross-linking process and resulted in either very poor cross-linking or cross-linking that was not substantially completed, even 30 days post-manufacture.

There remains a need to provide a simple arrangement for allowing effective color coding of a cross-linked foamed product, and in particular, such a product that is red in color.

SUMMARY OF THE INVENTION

A foamed product, according to the present invention, comprises an extruded foam cross-linked polyethylene body and a disazo condensation color pigment.

According to a preferred aspect of the invention, the foamed product is a foamed backer rod suitable for hot sealing applications.

According to yet a further aspect of the invention, the foamed backer rod is red in color and preferably uses the color pigment sold by Sandoz under the trademark SANDORIN RED B (CI Pigment Red 214).

The present invention is also directed to a method of forming a colored, cross-linked, polyethylene based, extruded foam product comprising the steps of foam extruding a suitable polyethylene mixture which forms cross-linked bonds after the extrusion of the product and adding to this suitable polyethylene mixture, prior to extrusion, a suitable concentrated, organic pigment which does not substantially adversely affect the rate at which cross-linking bonds form in the product relative to the rate that the cross-linked bonds would form if the color pigment was not present.

According to a preferred aspect of the invention, the method uses an organic color pigment of a disazo condensation color pigment type.

According to yet a further aspect of the invention, the color pigment type is red.

When a disazo condensation color pigment is used in either the product or in the method, it has been found that the resulting product achieves a high degree of cross-linking rendering the product suitable for use with a hot sealant within at least 72 hours of manufacture.

DETAILED DESCRIPTION OF THE PREFERRED EMBODIMENTS

It has been found that organic color pigments as opposed to inorganic color pigments reduce the blocking of the cross-linking process and reduce the typical time to achieve effective cross-linking from several months with inorganic color pigments to approximately one month. Unfortunately, storing manufactured product for at least a month is not desirable and would greatly increase the cost of such a foamed product. Therefore, significant benefits with respect to the rate of cross-linking can be achieved by using an organic pigment as opposed to inorganic pigments. Inorganic pigment used in the product may delay effective cross-linking for 4 to 5 months.

It has been found that a disazo condensation color pigment, which is a very concentrated pigment, can be added to the polyethylene material prior to foaming and does not substantially affect the cross-linking process. Typically, with this type of pigment, cross-linking is completed within days and certainly a satisfactory product can often result within 72 hours of manufacture. A complete description of disazo condensation pigments is found in H. Breitschmid, "Disazo Condensation Pigments", pp. 587-598, PIGMENT HANDBOOK, Vol.1, 2nd ed., ed. by Peter A. Lewis, A Wiley-Interscience Publication, New York (1988). This type of color pigment is expensive, but is highly concentrated, and therefore, less of the pigment is required while still achieving a very deep color effect. Therefore, although the cost for the color pigment is high, less of the material is used and it is a viable alternative to the more conventional pigments, particularly when the very dramatic improvement in rate of cross-linking is achieved.

Disazo condensation pigments typically have a high molecular weight and only very small quantities are necessary to achieve a deep cold. Possibly, the low concentrations are the most important factor in explaining why the good cross-linking rate is achieved. Another factor may be that these pigments are very pure with no heavy metals. The heavy metals may detrimentally affect the cross-linking rate.

One preferred disazo condensation color pigment is manufactured by Sandoz under the trademark SANDORIN RED BN identified by the Color Institute as Pigment Red 214. This is red color pigment and provides a very deep red color, allowing this cross-linked foam backer rod for hot sealant applications to be easily identified. A very high degree of cross-linking was achieved within 72 hours of extrusion, such that it would be suitable for hot sealant applications and good results were achieved, even within 24 hours of manufacture. These time frames are easily within the conventional time frames used if the cross-linked product was manufactured in black, i.e. carbon particles being added to the polyethylene material, or in white. White and black were the traditional colors used for cross-linked products, and the other colors, and particularly a red color, had not been produced where the required extent of cross-linking can occur within a very short period of the manufacture of the product.

The following is an example of a formulation for the cross-linked foam backer rod product using the preferred disazo condensation color pigment:

100 lbs. of the silane cross-linkable resin,
2–7% of the cross-linking catalyst,
0.5–3% nucleating agent,
1–5% color pigment.

Good cross-linking is achieved at all concentrations of the preferred color pigment and good depth of color is achieved with concentrations as low as 1 to 2%. Satisfactory cross-linking is achieved within 72 hours of manufacture.

For inorganic color pigments, 4 to 5% was required and cross-linking required at least several months to reach satisfactory levels. Organic color pigments in similar concentrations produced a product which was sufficiently cross-linked in about one month's time.

For comparison purposes, carbon black particles used as the color pigment for traditional black cross-linked backer rod is added in concentrations of about 2%.

If a yellow backer rod is to be produced, a Yellow HGR AE-30 or Yellow H3R AE-30 disazo condensation pigment is substituted for the red disazo condensation pigment. These yellow pigments are available through Resco Colours Inc., a subsidiary of Hoechst Canada Inc. The actual color pigments sold are slightly less than 50% active pigment with the balance being polyolefin resin. Other manufacturers may vary this relationship and require some modification of the ranges stated above.

Although various preferred embodiments of the present invention have been described herein in detail, it will be appreciated by those skilled in the art, that variations may be made thereto without departing from the spirit of the invention or the scope of the appended claims.

I claim:

1. A foamed product comprising an extruded foam cross-linked polyethylene body and a disazo condensation color pigment.

2. A foamed product as claimed in claim 1 wherein said foamed product is a backer rod suitable for hot sealing applications.

3. A foamed product as claimed in claim 2 wherein said color pigment is red.

4. A foamed product as claimed in claim 1 wherein said product is a backer rod.

5. A foamed product as claimed in claim 4 containing 1 to 5% color pigment.

6. A foamed product as claimed in claim 4 containing 1 to 2% color pigment.

7. A foamed product as claimed in claim 5 wherein said color pigment is red or yellow.

8. A foamed product as claimed in claim 6 wherein said color pigment is red or yellow.

9. A foamed product as claimed in claim 2 wherein said color pigment is Color Institute Pigment Red 214.

10. A foamed product as claimed in claim 1 wherein said color pigment is Color Institute Pigment Red 214.

* * * * *